United States Patent [19]

Herbst, Jr.

[11] Patent Number: 4,637,867
[45] Date of Patent: Jan. 20, 1987

[54] PROCESS FOR PRODUCING HYDROGEN FROM SHORT WAVELENGTH ELECTROMAGNETIC RADIATION

[76] Inventor: Ralph L. Herbst, Jr., 926 Langdon Ave., Box No. 6, Horsham, Pa. 19044

[21] Appl. No.: 311,288

[22] Filed: Oct. 14, 1981

[51] Int. Cl.$^4$ ............................................. B01J 19/08
[52] U.S. Cl. ................................................. 204/157.52
[58] Field of Search ................ 204/157.1 H, 157.1 W, 204/157.1 R, 129; 252/429 R, 432

[56] References Cited

U.S. PATENT DOCUMENTS

| | | | |
|---|---|---|---|
| 2,534,533 | 12/1950 | Schlesinger et al. | 423/288 |
| 3,210,157 | 10/1965 | Lewis et al. | 23/211 |
| 4,105,517 | 8/1978 | Ryason | 204/157.1 W |
| 4,121,984 | 10/1978 | Gomberg et al. | 204/157.1 H |
| 4,176,026 | 11/1979 | Harriman et al. | 204/157.1 W |
| 4,211,621 | 7/1980 | Porter | 204/157.1 W |
| 4,298,439 | 11/1981 | Gafney | 204/157.1 R |
| 4,315,998 | 2/1982 | Neukers et al. | 204/157.1 R |
| 4,325,793 | 4/1982 | Kisch | 204/157.1 R |
| 4,338,291 | 7/1982 | Yamada et al. | 204/158 R |
| 4,367,131 | 1/1983 | Gratzel et al. | 204/157.1 W |

FOREIGN PATENT DOCUMENTS 2815705  10/1978  Fed. Rep. of Germany ... 204/157.1 W

OTHER PUBLICATIONS

Gohn et al., "Homogeneous Photoredox for Hydrogen Production by Solar Energy, " pp. 1135-1139, Jul. 23, 1979.
Morapour et al., "Hydrogen Production by Visible Light Irradiation of Aqueous Solutions of RU (BI PY)$_3{}^{2+}$, pp. 547-549, Jul. 1978.
Spinks and Woods "An Introduction to Radiation Chemistry", Second Edition (1976) pp. 1, 6-7, 17-18, 25, 258-259, 268-269, 276-278, 280, 330-335, 339-342, 360-361, 365, 387-388 and 391.

*Primary Examiner*—Howard S. Williams
*Assistant Examiner*—Terryenie Chapman
*Attorney, Agent, or Firm*—Frishauf, Holtz, Goodman & Woodward

[57] ABSTRACT

Processes for producing hydrogen gas from water using gamma-rays, X-rays or ultraviolet radiation as the energy source, and aqueous compositions used in said processes. Said aqueous composition comprises at least one photoexcitable reagent which absorbs light to donate an electron and produce hydrogen. The composition also contains at least one reagent selected from the group consisting of chain reaction agents which are free radical formers, and spectral sensitizers, and preferably at least one reagent of each of these two types. The composition also preferably contains a dispersing agent.

26 Claims, No Drawings

PROCESS FOR PRODUCING HYDROGEN FROM SHORT WAVELENGTH ELECTROMAGNETIC RADIATION

BACKGROUND OF THE INVENTION

The present invention provides processes for producing hydrogen from aqueous compositions using short wavelength electromagnetic radiation.

Hydrogen gas is used in many industrial processes and is considered as a potential fuel source. At the present time, processes for producing hydrogen gas from hydrocarbons or by the electrolysis of water are not considered economical. The market potential for hydrogen gas would be much larger if it were available in large quantities at an economical cost.

The radiation chemistry of water and aqueous solutions using radioactive isotopes has been studied comprehensively for over 30 years. Excellent reviews are given in the following references: A. O. Allen, "The Radiation Chemistry of Water and Aqueous Solutions," D. Van Nostrand Company, Inc., Princeton, N.J. 1961; J. W. T. Spinks and R. J. Woods, "An Introduction to Radiation Chemistry," 2nd Edition, J. Wiley & Sons, New York, N.Y., 1976; G. Stein, "Radiation Chemistry of Aqueous Systems," The Weizmann Science Press of Israel, Jerusalem (1968); and I.G. Draganic and Z.D. Draganic, "The Radiation Chemistry of Water," Academic Press, New York, 1971.

An economical process for the production of hydrogen gas using radioactive isotopes has not been developed because radiation-chemical yields of hydrogen gas are very low. $G_{H_2}$ values are about 0.45 when aqueous solutions are irradiated; see Draganic and Draganic reference, page 76. The G value is the number of hydrogen molecules formed per absorbed 100 e. V of energy.

It is an object of the present invention to provide economical processes for producing hydrogen from aqueous compositions.

THE INVENTION

Hydrogen gas is produced from an aqueous composition comprising (i) photoexcitable reagent(s) and (ii) chain reaction agent(s) or spectral sensitizer(s) which is irradiated with gamma-rays, X-rays or ultraviolet light. Preferably the composition contains the chain reaction agent and also contains spectral sensitizer(s) (an auxiliary photoexcitable reagent) and/or dispersing agent(s) and more preferably all of them.

Gamma-rays are electromagnetic radiation (photons) of nuclear origin with short wavelengths ranging from about $3\times 10^{-11}$ cm. to about $3\times 10^{-9}$ cm. Cobalt-60 is the most widely used source today. It emits equal numbers of gammaphotons of 1.332 MeV and 1.173, average 1.25 MeV. (MeV is one million electron volts of energy). Caesium 137 is another available source of gamma-rays.

Low-level radioactive wastes from nuclear energy plants are also a large potential source of gamma-rays. Most of the gamma energy comes from Cesium 137 and Strontium 90. There are reported to be hundreds of thousands of spent fuel rods existing in the world. Each of these rods is reported to measure approximately 8.5 square inches by 13 feet in length and generates about $10^4$ roetgens/hour of gamma-radiation. One roentgen is an exposure dose of gamma-radiation such that the corpuscular emission of air produces, in air, ions carrying one electrostatic unit quantity of electricity of either sign. The gamma-radiation which is emitted has a broad wavelength spectrum and may cover the $3\times 10^{-11}$ cm. to $3\times 10^{-9}$ cm. range.

Low-level radioactive wastes from nuclear energy plants are the preferred energy source. With proper shielding, high-level reprocessing wastes also represent a large energy potential. Although their high-level wastes do not contain radioactive uranium and plutonium isotopes, they contain all of the other useful radioactive isotopes present in low-level radioactive wastes.

X-rays are produced by X-ray machines and are generally considered to be wavelengths ranging from about $3\times 10^{-9}$ to about $3\times 10^{-6}$ cm. Ultraviolet radiation is considered to range from about $3\times 10^{-6}$ to about $3\times 10^{-5}$ cm.

The gamma-rays lose a large amount of their energy whenever they react with matter. The effect of the absorbing matter is to reduce the number of photons transmitted so as to diminish the intensity of the radiation passing through it. The reduction of the intensity depends upon the absorption coefficient of the material and its thickness. Materials with a high atomic number such as lead are more efficient absorbers than water which has a relatively low coefficient. Further details of the absorption process are given in the references cited previously. X-rays have similar properties but are less powerful and, therefore, do not have them to the same degree as gamma-rays. Ultraviolet radiation, although powerful when considered in contrast to visible light radiation, is less powerful than the other short wavelength radiation which is also useful in the processes of the present invention.

It is generally believed that solvated electrons are formed when liquid aqueous solutions are irradiated with high energy photons. They react as follows to form hydrogen atoms (H.):

$$e_{aq}^- + H^+ \rightarrow H. \tag{1}$$

$$e_{aq}^- + H_2O \rightarrow H. + \overline{O}H \tag{2}$$

The H. couple to form hydrogen gas

$$2H. \rightarrow H_2 \tag{3}$$

They can also abstract H from H-containing solutes in the aqueous composition to form hydrogen gas.

The photoexcitable reagents include ions which are photoexcited by the short wavelength radiation and which in the photoexcited state donates an electron, probably to the water to form hydrated electrons ($e_{aq}^-$). When ultraviolet radiation is utilized as the short wavelength electromagnetic radication, the ultraviolet radiation (in the form of photons) per se is considered to be the cause of the photoexcitation of the photoexcitable reagent. When gamma-rays or X-rays are the short wavelength electromagnetic radiation source, it is not known to a certainty whether the photons of the gamma-rays (or X-rays) themselves excite the photoexcitable reagent or whether the excitation occurs as a result of secondary radiation caused by the interaction of the gamma-rays or X-rays with material in the aqueous composition with the secondary radiation produced as a result of at least one physical effect such as those disclosed in the Spinks and Woods reference identified hereinbefore at pages 38–65 Such secondary radiation is of longer wavelength (Stokes' Law) which may be in the ultraviolet range. The photoexciable reagents may be excited by any of these sources of short wavelength radiation in the aqueous compositions of this invention.

Because of the high energy of the short wavelength radiation particularly the gamma-rays and to a somewhat lesser extent the X-rays, any material which as the result of contact with the photons of the radiation gives off an electron, will to some extent function as a photoexcitable reagent.

Based upon work to date, the following materials are suitable photoexcitable reagents. Suitable cationic photoexcitable reagents include $Fe^{++}$, $Co^{++}$, $Ni^{++}$, $Pb^{++}$, $Pt^{++++}$, $Ir^{+++}$, $Os^{+++}$, $Pd^{++++}$, $ZrO^{++}$, $Rh^{+++}$, $Ru^{+++}$, $Cr^{++}$, $Ti^{+++}$, $Ce^{+++}$, $V^{++}$, $Cu^+$, $Ag^+$, $Au^{++}$, $U^{+++}$, $Pt^{++}$, $Pd^{++}$, and $Eu^{++}$. The ions are as a practical matter introduced into the composition tion in the form of their inorganic salts such as $H_2PtCl_6$, $Cr(NO_3)_2$, $FeCl_2$, $CoAc_2$, $CoCl_2$, $PbCl_2$, $PbAc_2$, $NiCl_2$, $RhCl_3$, $RuCl_3$, and $ZrOCl_2$. Of these the best results have been obtained with $Cr^{++}$, $Fe^{++}$, and the $(PtCl_6)^=$. The above noted valence states are considered to be the valence state based on the compound used in making up the composition. The actual valence states existing during operation are not known with certainty.

Other cations such as $Mg^{++}$, $Zn^{+2}$, $Al^{+++}$, $Be^{+++}$, $Cd^{++}$, $Hg^+$, $Sb^{+++}$, $Na^+$, $K^+$, $Li^+$, $Ca^{++}$, $Ba^{++}$, $Sr^{++}$ and $NH_4^+$ could also be used with high energy gamma-radiation.

Most of the metallic elements including the elements specified in the preceding paragraph as cations are also suitable photoexcitable reagents when included as part of an anionic complex, such as $(CoCl_4)^=$, $(FeCl_4)^=$, $(Fe(SO_4)_4)^=$, and $(PtCl_6)^=$.

Suitable anionic photoexcitable reagents include $I^-$, $Br^-$, $Cl^-$, $NO_3^-$, $SO_4^=$, $SeO_4^=$, $TeO_4^=$, $ClO_4^=$, $PO_4^=$, $SiO_4^=$, $BO_2^-$, $B_4O_7^=$, $BO_3^-$, $S^=$, $SH^-$, and $S_2O_6^=$. These may be used as the only photoexcitable reagents or in combination (e.g., a complex) with the photoexcitable cations or metal particles.

Metals in the form of particles, preferably colloidal, may also be used as the photoexcitable reagent since they emit an electron. They also emit secondary radiation when contacted with the high energy short wavelength radiation and particularly high energy gamma-rays. Such secondary emission often occurs in the ultraviolet range. The preferred metals are the noble metals which include silver, gold, platinum, the platinum group metals, etc. These metal particles are often formed in situ as illustrated in Example 3. The transition metals and particularly the ferrous metals (iron, nickel and cobalt) and such other metals which are known to emit secondary radiation in the ultraviolet including antimony, zinc, cadmium, and mercury also may be used.

Similarly photoexcitable reagents include reagents having high surface area (very fine particle size) and known as hydrogenation catalysts. These may be used as such or when deposited on inorganic supports or carriers which are preferably also in fine particle size. These include Co, Ni, Fe, Cr, Cu, Pd, Pt, Re, Rh, Ru, Raney Ni, Raney Co, Raney Fe, Raney Cr, and Raney Cu, chromium oxide, cobalt oxide-molybdenum oxide, and copper oxide. These catalysts may be deposited on supports such as kieselguhr, molecular sieve zeolites, mordenites, alumina, silica fibers, calcium oxide, barium oxide, and silicates.

Because of the high energy of the short wavelength electromagnetic radiation which is utilized and its effect to decompose most organic materials or materials having organic components, such organic materials and/or materials having organic components should be excluded from the aqueous compositions of the present invention except for those organic materials or materials containing organic components which are sufficiently stable so that they are operative under the severe operating conditions of the present invention.

Methyl viologen, 1,1-dimethyl-4,4'-dipyridinium dichloride $(MV^{++})$ when used with the $NaBH_4$ chain reaction agent in the aqueous composition produces hydrogen gas under ultraviolet radiation as disclosed in Example 6. It is postulated that the $MV^{++}$ is reduced in the aqueous composition during the photolysis to the cation radical, i.e., $MV^+\cdot$, which then donates an electron to $H^+$ or $H_2O$ to form a hydrogen atom which, in turn, forms hydrogen gas. The $MV.^+$ is concomitantly oxidized to the $MV^{++}$ form which, in turn, is again reduced to the $MV.^+$ form. The chain reaction agent appears to promote this reduction.

It is considered that methyl viologen may be unstable under gamma radiation because of the presence of the two methyl substituents. However, the corresponding compound 4,4'-dipyridinium dichloride should function in the same manner as the methyl viologen. Other compounds function in a manner similar to methyl viologen under ultraviolet radiation and are broadly referred to herein as methyl viologen-type reagents. Such reagents include methyl viologen, 1,1-propylene,2,2'-bipyridine bromide, 4,4'-dimethyl-1,1'-propylene-2,2'-bipyridine dibromide, 1,10-propylene-1,10-phenanthroline dibromide, 4-chloro-1,10-propylene-1,10-phenanthroline dibromide, 4-methyl-1,10-propylene-1,10-phenanthroline dibromide, 4,7-dimethyl-1,10-propylene-1,10-phenanthroline dibromide, and 4,7-diphenyl-1,10-propylene, 1,10-phenanthroline dibromide. It is considered that specific of the aforenoted compounds not be stable under gamma radiation during commercial exposure times. However, 1,10-phenanthroline dihalides and 4,4'-dipyridinium dihalides should be stable. Specific substituted phenanthroline dihalides and substituted dipyridinium dihalides should be stable under the gamma radiation.

Methyl viologen and methyl viologen-type reagents are known to decompose water in the presence of colloidal platinum as a catalyst and in the presence of a spectral sensitizer, commonly tris(2,2'-bipyridyl)Ru(II) chloride, when subjected to visible light. In the past it has been considered that the methyl viologen itself was not a photoexcitable reagent in the sense that it did not operate to decompose water in the absence of the spectral sensitizer and the colloidal noble metal catalyst. I have discovered that the methyl viologen acts as a photoexcitable reagent in the presence of the chain transfer agents and specifically in the presence of sodium borohydride. The methyl viologen itself or its reduced species may be the photoexcitable reagent.

It is postulated that when the photoexcitable reagent is excited and donates an electron which splits the water to form the hydrogen radical, the photoexcitable reagent is itself either immediately or after intermediate reaction(s) oxidized, e.g., the photexcitable $Fe^{++}$ is oxidized to $Fe^{+++}$. The chain reaction agent forms free radicals and functions to promote the formation of hydrogen; reduces the oxidized photoexcitable reagent; and protects the spectral sensitizers from becoming reduced. The reaction agent forms chain reaction promoting free radicals as a result of reaction with hydrogen radicals and regenerate the photoexcitable ion. The chain reaction agent forms free radicals when exposed to the radiation and/or when it reacts with hydrogen atoms and/or another free radical. They are non-sacrificial, i.e., they are not consumed during the production of hydrogen. They are postulated to function as illustrated in the following reactions:

  (8)

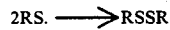  (9)

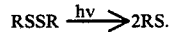  (10)

  (11)

  (12)

$M^{+++}$ is for example, $Fe^{+++}$.

R is an organic or inorganic moiety as set forth herein.

The inorganic chain reaction agents determined to date are the borides and compounds having structures which I consider (as they relate to their function in the present invention) to be analogous to the structures of the organic chain transfer agents used in polymerization. The inorganics have the general structures $(Y-X_n-H-)^-$ and $(Y-X_m-Y)^=$. The minus symbol may be a single minus value or a multiple minus value dependent upn the valence of the X atom. The above-noted structures are anions which may be associated with any cation which does not adversely effect the function of the aqueous composition to produce hydrogen. "n" and "m" are 1 or more and preferably 1 or 2, with a maximum of about 10 with Se, Te and S. Potassium, sodium and ammonium are preferred. X is boron, sulfur, selenium, tellurium or phosphorus. Y is oxygen, sulfur, selenium, tellurium, or hydrogen. When there are multiple Y groups which is the usual instance, some of the Y groups may be replaced by hydrogen or a highly stable organic group when such compounds exist. These inorganics either lose a hydrogen atom or split under the reaction conditions to form free radicals as illustrated in the following equations.

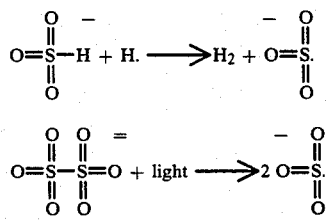

It is believed that the above-depicted radicals reduce the oxidized metal photoexcited reagent to its reduced valence state, and also may couple to form a coupled compound, e.g., RSSR, which splits under the influence of the radiation to again form the free radical, e.g., RS., and/or form free radicals as the result of reaction with a hydrogen radical. The preferred inorganic chain reaction agents are the sodium, potassium, and ammonium salts of the following anions: hydrogen sulfite, thiosulfite, thiosulfate, dithionite, dithionate, hydrogen selenite, and hydrogen tellurites, and hydrogen borites. Those which are odorless and water soluble are particularly preferred for use as the sole chain reaction agent or as one of a number of chain reaction agents used in combination.

The borides which have at least one hydrogen atom bonded to boron (or at least the ability to bond to a hydrogen atom in the aqueous composition during production of hydrogen) exhibit the highest activity or effectiveness as the chain reaction agent in that when a boride is the only chain reaction agent in an aqueous composition of the present invention, the production of hydrogen is greater than with the same aqueous composition containing one of the other chain reaction agents.

Borides of cobalt, nickel and iron are reported to have the structure $(A_2B)_5H_3$ wherein A is the metal atom. Other transition metals and noble metals, such as copper, titanium, vanadium, zirconium, manganese, tin, platinum, rhodium, ruthenium, palladium, osmium, and iridium also have proven effective when combined with boron as part of the same compound which have sometimes been reported as metal borides and as metal borohydrides. These borides can be produced by reaction of a metal salt with dry sodium borohydride or another borohydride such as potassium borohydride, lithium borohydride, or sodium cyanoborohydride; the latter in alkaline systems to avoid formation of HCN. The reaction product is in the form of very fine particles which would be added to the aqueous composition by mixing them in the desired amount. These borides preferably are formed in situ by adding sodium borohydride (in the absence of oxygen) to an aqueous composition of the present invention which contains a metal cation other than an alkali metal or alkaline earth metal ion, preferably one of the metal salts, and hydrogen is subsequently produced by exposing the aqueous composition to light. Corresponding borohydrides such as potassium borohydride, sodium cyanoborohydride, ammonium borohydride, lithium borohydride, etc. can be used. Diboranes, e.g. $H_3BBH_3$, can also be used.

It is believed that the boride functions as a chain reaction agent by losing a hydrogen in the aqueous composition when the reaction occurs, probably by reaction with a hydrogen atom, to form a radical, for example, as postulated in the following equation

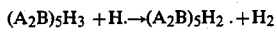

The boride radical depicted above functions to reduce the photoexcitable reagent from its oxidized state to its reduced state and may also couple, in the manner described hereinbefore for the RS. radicals.

The foregoing illustrates my preferred systems utilizing a photoexcitable cation. I have also discovered that sodium borohydride ($NaBH_4$) functions as the chain transfer agent in systems which do not contain a metallic cation other than the sodium. THe sodium borohydride or a decomposition product thereof (probably the $BH_4^-$) acts to reduce the oxidized photoexcitable reagent. It apparently also reacts with hydrogen atoms to form hydrogen gas as postulated in the following equations.

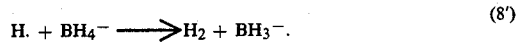  (8')

  (9')

-continued

The NaBH$_4$ and KBH$_4$ are the most preferred chain reaction agents. LiBH$_4$ and NH$_4$BH$_4$ are also useful chain reaction agents.

The chain reaction agents appear to be analogous to the sulfur-containing chain transfer agents used in polymerization reactions to regulate the molecular weight of polymers. Such agents are described in William Austin Pryor, *Mechanics Of Sulfur Reactions,* McGraw-Hill, New York, NY (1962), particularly pages 50–90; *Sulfur in Organic and Inorganic Chemistry,* Alexander Senning, Vol. I, Vol. II and Vol. III, Marcel Dekkar, New York, N.Y.; and *Radicals,* Nonhebel, Teddar and Walton, Cambridge University Press (1979) which are incorporated by reference.

The organic chain reaction agents have the structure RZ$_n$H or RZ$_m$R wherein n is at least one and m is at least 2, and preferably not larger than about 8–10, e.g polysulfides; more preferably, n is 1 and m is 2, i.e., RZH and RZZR. Z is boron and also the atoms in the third and higher periods (rows) of the Periodic Table which can accommodate more than eight outer valence electrons by using its d orbitals. Z is preferably boron or an atom of the III, IV, V or VI Groups of the Periodic Table and of the third, fourth or fifth rows thereof and is more preferably a member of Group IVA, VA and VIA. The particularly preferred Z atoms are boron, sulfur, phosphorus, selenium, tellurium, and tin. The R group is an organic group as described hereinafter, which in conjunction with the metal atom forms a moiety which can form a free radical, e.g., when in the form of RZZR by splitting under the influence of light, and/or when in the form of RZH forms free radicals (RZ.) as the result of reaction with hydrogen radicals and two RZ. radicals can form RZZR.

The organic chain reaction agents having the formula RSH, R(SH)$_2$, and RSSH are generally preferred with those having the formula RSH present being the more highly preferred because they are cheaper. As illustrated, it is postulated that the RZ$_n$H, e.g. RSH, compounds and the RZ$_m$R, e.g. RSSR, compounds are both present at different stages and either may be the starting agent. It is preferred that when using organic agents, the agent in the aqueous composition form RZ$_n$R, e.g. RSSR, which undergoes spontaneous decomposition in the presence of light to form the RZ$_n$. radicals, e.g. RS. radicals. When the agent is in the RZ$_n$H form, it forms free RZ$_n$. radicals when it reacts with hydrogen atoms.

The R groups are organic moieites which are stable (radiation resistant) under the operating conditions. They are preferably selected from polyphenyls such as diphenyl, terphenyl, quaterphenyl, etc.; and polynuclear aromatics such as naphthalene, anthracene, phenanthrene, pyrene, chrysene, phthalocyanines, metallophthalocyanines, porphyrines, metalloporphyrines, bipyridyls, quinolines, phenanthrolines, and indigo-type compounds.

It is postulated that the spectral sensitizers which preferably are included in the aqueous compositions absorb radiant energy and transfer it to the photoexcitable reagent thereby promoting the production of hydrogen. The spectral sensitizers function in a manner analogous to the materials which have been disclosed to be spectral sensitizers in the photographic process and in some instances are species within the genuses disclosed for this purpose, e.g. the phthalocyanines. A primary limitation on using compounds' disclosed to be spectral sensitizers is that most of these compounds are organic compounds which are unstable when irradiated with gamma-rays, X-rays or ultraviolet light. The useful compounds include polyphenyls and polynuclear aromatic hydrocarbons which are radiation resistant and absorb in the ultraviolet, such as diphenyl, terphenyl, quaterphenyl, naphthalene, anthracene, phenanthrene, pyrene, and chrysene, etc. The following are preferred: anthracene, indigo, phthalocyanine, copper phthalocyanine, diphenyl and tris(2,2-bipyridyl) Ru(II) chloride.

I discovered that the spectral sensitizers which I first used in conjunction with the photoexcitable reagents to promote the production of hydrogen are themselves capable of functioning as the sole photoexcitable reagent in the presence of a chain transfer agent as illustrated in Example 6 reporting the production of substantial amounts of hydrogen in systems in which the only ingredient which was photoexcitable was the spectral sensitizer when used together with the sodium borohydride chain reaction agent. Accordingly, the spectral sensitizers are included within the definition of photoexcitable reagent broadly and when the term spectral sensitizer is used in reference to a composition which contains another photoexcitable reagent, the spectral sensitizer is an auxiliary photoexcitable reagent.

The organic chain reaction agents RZ$_n$H and RZ$_m$R disclosed hereinbefore may also function as spectral sensitizers. Thus when Z is boron, this reagent may function as both the chain reaction agent and the photoexcitable reagent.

I discovered that the production of hydrogen is improved when the aqueous compositions are in the form of a very fine dispersion containing dispersed solids in the aqueous solution. This dispersion is facilitated by including a dispersing agent in the composition. Colloidal silica (SiO$_2$) suspension is a suitable dispersing agent which increases markedly the production of hydrogen gas when present in (preferably deaerated) aqueous compositions of the present invention. The acid colloidal silica is preferred and has a relatively high tolerance for the photoexcitable reagents used. Because of its high surface area of 135 to 190 meters$^2$/gram, it effectively disperses the inorganic (preferably boride) chain reaction agents throughout the aqueous composition. Other dispersing agents include Al$_2$O$_3$, MgO, CaO, BaO, Sr$_2$O$_3$, Na$_2$O, K$_2$0, Be$_2$O$_3$, inorganic silicates, clays, zeolites, bentonites, and morendites, etc.

The aqueous acid colloidal silica dispersing agent precipitates irreversibly when frozen and also when heated to boiling. The preferred temperature range when using the acid colloidal silica is between 5° C. and 70° C. Because the acidic colloidal silica is unstable at pH's below about 2.5 and above 5, operation is carried out within this range and preferably between 3 and 4.

The pH of the aqueous composition may go up to about 11 dependent upon the photoexcitable reagent used and the use of a dispersing agent and other reagents stable at the operating pH. Generally the reaction tends to slow with excess build-up of hydroxyl ions which renders operation at pH below about 8 and particularly below about 7 to be preferred. The range of about 2–6.5 is more preferred.

As irradiation proceeds, the aqueous compositions become enriched with hydroxyl ions. For continuous operation, the pH is preferably adjusted so that it does not go above about 6-6.5. Excess hydroxyl ions are removed by passing the aqueous composition through a weakly basic anion exchange resin (chloride form). Strongly basic anion exchange resins are undesirable because they absorb the silica.

The preferred concentrations follow:

| Ingredient Water | Amount (Parts by Weight) 100 | | |
|---|---|---|---|
| | Broad Preferred Range | Preferred | More Preferred |
| Photoexcitable reagent | $10^{-7}$ to 20 | $10^{-3}$ to 2 | $10^{-2}$ to 1 |
| Chain reaction agent | $10^{-7}$ to 20 | $10^{-4}$ to 5 | $10^{-3}$ to 1 |
| Dispersing agent | $10^{-7}$ to 16 | $10^{-3}$ to 10 | $10^{-3}$ to 5 |
| Spectral sensitizer | $10^{-8}$ to 2 | $10^{-5}$ to $10^{-3}$ | $10^{-5}$ to $10^{-4}$ |

The maximum amount of each constituent and the total of all constituents is limited by solubility and/or the ability of the composition to maintain the solid particle constituent (preferably very finely divided) in a suspended or dispersed form, a colloidal, a slurry or even in the form of an aqueous gel. Larger concentrations would operate to produce hydrogen but are not preferred even for a broad definition because of difficulty in processing the aqueous composition.

THE EXAMPLES

The following Examples illustrate various aspects of the invention and/or materials used therein. All parts and percentages are by weight unless volumetric units are indicated.

In Examples 1 and 2 gamma-ray irradiations were carried out in 200 mm×25 mm Pyrex glass test tubes containing 5.0 ml of "triply" distilled water and 5.0 ml of Nalcoag 1034-A, a colloidal silica manufactured by Nalco Chemical Company. Its colloidal silica content is 34%; pH =3.1; average particle size 16–22 m$\mu$; average surface area 135 to 190 meters/gram. The "triply" distilled water was made by successively distilling water from alkaline potassium permanganate and acidic sodium dichromate. The test tube reactors were positioned around a Cobalt-60 source so that the gamma radiation dosage was either 0.12 or 0.23 megarads/hour. This dosage is believed to simulate the dosage available from spent fuel rods.

Example 1

The ingredients specified for composition "a" through composition "r" in Table I, with the exception of the NaBH$_4$ chain reaction forming agent, were added with stirring to the watercolloidal silica blend until mixed and the NaBH$_4$ was stirred into the composition as the last component which is added. These compositions in separate tubes were exposed to the gamma radiation for 10 minutes. The hydrogen gas which formed in the test tube reactor passed through a 23 ft. length of one-quarter inch ID polyethylene tubing which was immersed under water. The hydrogen gas was collected volumetrically and its composition analyzed mass spectrametrically. The purity of the hydrogen.is 99+%.

For each experiment, the sample weight was 11.31 g. For the 0.23 megarads/hour dosage, the absorbed radiation is estimated as $1.2\times10^{16}$ 100 e V/minute based on 1 rad equal to $6.24\times10^{13}$ e V/gram (see Spinks & Woods reference, pg. 68). For the 0.12 megarads/hour dosage, the absorbed radiation is $2.4\times10^{16}$ 100 e V/minute.

The G values listed in Table I were computed by the following equation:

$$G = \frac{\text{number of H}_2 \text{ molecules produced per minute}}{\text{number of rads absorbed per 100 } e\ V \text{ per minute}}$$

As noted in Table I, the $G_{H_2}$ values range from 613 to 3960 and are substantially higher than those given in the references referred to hereinbefore which disclose the production of hydrogen from water when exposed to short wavelength electromagnetic radiation. Best results were obtained using chromium nitrate, ferrous chloride, and chloroplatinic acid (H$_2$PtCl$_6$) as the photoexcitable reagent. No hydrogen formed when only the water/colloidal silica blend was irradiated in a control experiment.

TABLE I

| Ingredient/Amount | | a | b | c | d | e | f | g | h | i |
|---|---|---|---|---|---|---|---|---|---|---|
| Photoexcitable Reagent | | | | | | | | | | |
| H$_2$PtCl$_6$ | g. | 0.1 | 0.1 | 0.1 | 0.1 | 0.1 | 0.1 | 0.1 | 0.1 | 0.1 |
| Chain Reaction Agent | | | | | | | | | | |
| NaBH$_4$ | g. | 0.05 | 0.05 | 0.05 | 0.05 | 0.05 | 0.05 | 0.05 | 0.05 | 0.05 |
| Na$_2$S$_2$O$_6$ | g. | — | 0.01 | 0.01 | 0.01 | 0.01 | 0.01 | 0.01 | — | 0.01 |
| Spectral Sensitizer | | | | | | | | | | |
| Anthracene | g. | — | — | 0.002 | — | — | — | — | 0.002 | — |
| Indigo | g. | — | — | — | 0.002 | — | — | — | — | — |
| Phthalocyanine | g. | — | — | — | — | 0.002 | — | — | — | — |
| Copper phthalocyanine | g. | — | — | — | — | — | 0.002 | — | — | — |
| Diphenyl | g. | — | — | — | — | — | — | 0.002 | — | — |
| Tris(2,2'-bipyridyl) Ru (II) chloride | g. | — | — | — | — | — | — | — | 0.002 | 0.002 |
| Gamma Radiation Dosage | | | | | | | | | | |
| megarads/hour | | 0.12 | 0.12 | 0.12 | 0.12 | 0.23 | 0.23 | 0.23 | 0.23 | 0.23 |
| Hydrogen Gas Production | | | | | | | | | | |
| Volume; cc after 10 minutes exposure | | 0 | 0 | 5.0 | 4.9 | 13.0 | 10.1 | 8.9 | 28.1 | 30.1 |
| $G_{H_2}$ value | | — | — | 990 | 970 | 1287 | 998 | 879 | 2780 | 2980 |

| Ingredient/Amount | | j | k | l | m | n | o | p | q | r |
|---|---|---|---|---|---|---|---|---|---|---|
| Photoexcitable Reagent | | | | | | | | | | |
| Cr(NO$_3$)$_2$ | g. | 0.1 | — | — | — | — | — | — | — | — |
| FeCl$_2$ | g. | — | 0.1 | — | — | — | — | — | — | — |
| Co acetate | g. | — | — | 0.1 | — | — | — | — | — | — |
| CoCl$_2$ | g. | — | — | — | 0.1 | — | — | — | — | — |
| PbCl$_2$ | g. | — | — | — | — | 0.1 | — | — | — | — |
| Pb acetate | g. | — | — | — | — | — | 0.1 | — | — | — |

TABLE I-continued

| | | | | | | | | | | |
|---|---|---|---|---|---|---|---|---|---|---|
| $NiCl_2$ | g. | — | — | — | — | — | — | 0.1 | — | — |
| $RhCl_3$ | g. | — | — | — | — | — | — | — | 0.1 | — |
| $RuCl_3$ | g. | — | — | — | — | — | — | — | — | 0.1 |
| Chain Reaction Agent | | | | | | | | | | |
| $NaBH_4$ | g. | 0.05 | 0.05 | 0.05 | 0.05 | 0.05 | 0.05 | 0.05 | 0.05 | 0.05 |
| $Na_2S_2O_6$ | g. | 0.01 | 0.01 | 0.01 | 0.01 | 0.01 | 0.01 | 0.01 | 0.01 | 0.01 |
| Spectral Sensitizer | | | | | | | | | | |
| Anthracene | g. | 0.002 | 0.002 | 0.002 | 0.002 | 0.002 | 0.002 | 0.002 | 0.002 | 0.002 |
| Gamma Radiation Dosage | | | | | | | | | | |
| megarads/hour | | 0.23 | 0.23 | 0.23 | 0.23 | 0.23 | 0.23 | 0.23 | 0.23 | 0.23 |
| Hydrogen Gas Production | | | | | | | | | | |
| Volume; cc after 10 minutes exposure | | 40.1 | 38.7 | 15.5 | 10.0 | 14.7 | 14.4 | 9.4 | 8.0 | 6.2 |
| $G_{H_2}$ value | | 3960 | 3840 | 1530 | 989 | 1450 | 1426 | 930 | 792 | 613 |

Example 2

Four colloidal platinum sols were prepared from chloroplatinic acid ($H_2PtCl_6$) using four different reducing agents: hydrogen gas, sodium citrate, hydrazine, and formaldehyde.

Hydrogen 0.1 g of chloroplatinic acid was dissolved in 5.0 ml of "triply" distilled water/5.0 ml Nalcoag 1034-A blend. Following the procedure of Rampino and Ford, J. Amer. Chem. Soc., (1941), p. 2745, hydrogen was bubbled through the blend at a rate of 25 cc per minute for 24 hours at 40° C. to 50° C. The colloidal silica was used in place of the polyvinyl alcohol used by Rampino and Ford because the latter is unstable when irradiated with gamma-radiation.

Sodium Citrate 0.2 g of sodium nitrate and 0.1 g of $H_2PtCl_6$ was dissolved in 5.0 ml of "triply" distilled water and heated at 80° C. for two hours. The solution was stirred with Rohm and Haas Amberlite MB-1 ion exchange resin in its H+ and OH- form. This is done to remove citrate which is unstable in the presence of gamma-radiation. The ion exchange resin was removed by filtration and the sol blended with 5.0 ml of Nalcoag 1034-A.

Formaldehyde 0.6 g of 37% formalin and 0.1 g of $H_2PtCl_6$ was dissolved in "triply" distilled water (pH=6) and heated to 80° C. for two hours. The excess formaldehyde was removed by vacuum because it decomposes in the presence of gamma-rays. The sol was then blended with 5.0 ml Nalcoag 1034-A.

Hydrazine 0.4 g of hydrazine sulfate and 0.1 g $H_2PtCl_6$ were dissolved in 5.0 ml of "triply" distilled water (pH=6), heated to 80° C. for two hours and blended with 5.1 ml Nalcoag 1034-A. 0.002 g of tris(2,2-bipyridyl) Ru(II) chloride was added to each platinum sol which contains 5 ml of triply distilled $H_2O$, 5 ml of the colloidal silica, 0.01 $Na_2S_2O_8$, and 0.002 anthracene and each was irradiated with 0.23 megarads/hr of gamma-rays for 10 minutes as described in Example I.

TABLE II

| Reducing Agent | Volume $H_2$ gas cc after 10 minutes exposure | $G_{H_2}$ Value |
|---|---|---|
| hydrazine | 2.1 | 208 |
| formaldehyde | 2.0 | 198 |
| sodium citrate | 2.7 | 267 |
| hydrogen gas | 2.1 | 208 |

As shown in Table II, the $G_{H_2}$ values ranged from 198 to 267.

Example 3

This example illustrates that the same basic recipe used in Example 1 can also be used in the ultraviolet region of the electromagnetic spectrum. The photolyses were carried out in an annular quartz reactor (220 cc volume of 9 inches long) equipped with an exit tube for passage of the hydrogen gas. The volume of hydrogen gas was determined volumetrically over water after 10 minutes photolysis using a linear Xenon flash tube which peaks at about 2000 to 3000§. The flash tube was operated at 2000 volts; capacitance 35 μF (micro Farads); and pulse rate of 60 flashes per second.

For each experiment in Example 3, the photoexcitable reagent was dissolved in 30 ml of 50/50 blend of "triply" distilled water and silica (Nalcoag 1134-A). The spectral sensitizer was added with stirring and the composition deaerated rigorously with helium gas, Then 0.3 g of $NaBH_4$ was added and the composition swirled inside the quartz reactor to wet the entire inner surface, and rigorously deaerated with He gas. Under these conditions, $CoCl_2$ gave the highest yield of hydrogen gas. The results are set forth in Table III.

TABLE III

| Ingredient/Amount | | a | b | c |
|---|---|---|---|---|
| Photoexcitable Reagent | | | | |
| $CoCl_2$ | g | 0.6 | — | — |
| $FeCl_2$ | g | — | 0.6 | — |
| $H_2PtCl_6$ | g | — | — | 0.6 |
| Spectral Sensitizer | | | | |
| anthracene | g | 0.002 | 0.002 | — |
| tris(2,2-bipyridyl) Ru(II) chloride | g | — | — | 0.002 |
| Hydrogen Gas Production | | | | |
| cc; 10 minutes photolysis | | 235 | 215 | 185 |

Example 4

This example illustrates that photoexcitable anions in the absence of a photoexcitable metallic cation can also be used.

The photolyses were carried out in the same apparatus and photolysis conditions as described in Example 3 using ultraviolet light. For each experiment, 0.3 g of the photoexcitable anion and 0.002 g of anthracene, the spectral sensitizer, was added with stirring, to 30 ml. of a 50/50 blend of "triply" distilled water and silica (Nalcoag 1034-A). The composition was swirled inside the quartz reactor to wet the inner surface and rigorously deaerated with helium gas. The results are set forth in Table IV.

TABLE IV

| Photoexcitable Reagent | Anion | Hydrogen Gas Production cc, 10 minutes photolysis |
| --- | --- | --- |
| $Na_2S_2O_6$ | $S_2O_6^=$ | 190 |
| $H_2SO_4$ | $SO_4^=$ | 170 |
| HCl | $Cl^-$ | 185 |
| HBr | $Br^-$ | 175 |
| HI | $I^-$ | 170 |
| $NaBO_2$ | $BO_2^-$ | 185 |

The $NaBO_2$ was generated in situ by reacting $NaBH_4$ with "triply" distilled water using the procedure of H. Brown, J. Amer. Chem. Soc. (1953), p. 215.

$$NaBH_4 + 2H_2O \rightarrow NaBO_2 + 4H_2$$

After all of the hydrogen gas evolved, the composition was rigorously deaerated with helium gas.

Example 5

This experiment illustrates the use of methyl violgen ($MV^{++}$), 1,1-dimethyl-4,4-dipyridinium dichloride which illustrates a salt comprising an organic cation and an inorganic anion photoexcitable reagent.

The photolyses were carried out as described in Example 4. For each experiment, 0.05 g of $Na_2S_2O_6$ and 0.008 g of $MV^{++}$ was added with stirring to 30 ml of a 50/50 blend of "triply" distilled water and silica (Nalcoag 1034-A). Other ingredients were added in separate experiments as listed in Table V. Colloidal Pt was prepared using the citrate and hydrazine reduction methods as described in Example 2.

TABLE V

| Ingredient/Amount | | a | b | c | d | e | f |
| --- | --- | --- | --- | --- | --- | --- | --- |
| Photo-excitable Reagent | | | | | | | |
| $FeCl_2$ | g. | 0.2 | 0.2 | — | — | — | — |
| $CoCl_2$ | g. | — | — | 0.2 | — | — | — |
| $H_2PtCl_6$ | g. | — | — | — | 0.2 | — | — |
| Colloidal Pt | | | | | | | |
| citrate reduction | g. | — | — | — | — | 0.10 | — |
| hydrazine reduction | g. | — | — | — | — | — | 0.1 |
| Chain Reaction Agent | | | | | | | |
| $NaBH_4$ | g. | 0.10 | 0.10 | 0.10 | 0.10 | — | — |
| Spectral Sensitizer | | | | | | | |
| tris(2,2-bipyridyl) Ru(II) chloride | g. | 0.002 | — | 0.002 | 0.002 | 0.002 | 0.002 |
| anthracene | g. | — | 0.002 | — | — | — | — |
| Hydrogen Gas Production | | | | | | | |
| cc; 10 minutes photolysis | | 190 | 215 | 170 | 185 | 135 | 150 |

Example 6

The apparatus and procedure of Example 4 was used. The basic formulation follows: 15 ml triply distilled water, 15 ml Nalcoag 1034-A, 0.002 g of the aforespecified spectral sensitizer and 0.1 $gNaBH_4$ which was added to the mixture of the other components. The other components and results are set forth in Table VI.

TABLE VI

| Ingredient/Amount | | a | b | c | d | e | f |
| --- | --- | --- | --- | --- | --- | --- | --- |
| Spectral Sensitizers | | | | | | | |
| anthracene | g | 0.002 | — | — | — | 0.002 | — |
| indigo | g | — | 0.002 | — | — | — | 0.002 |
| tris(2,2'-bipyridyl) Ru(II) chloride | g | — | — | 0.002 | — | — | — |
| Methyl Viologen | g | — | — | — | 0.008 | — | — |
| Sodium Chloride | g | — | — | — | — | 0.1 | 0.1 |
| Hydrogen Gas Production | | | | | | | |
| cc, total after 10 minutes photolysis | | 182 | 265 | 230 | 250 | 210 | 270 |

Although triply distilled water was used for control purposes during experiments, such purified water may not be required, so long as the water does not contain organic impurities which are unstable under the reaction conditions or other materials which adversely affect the reaction, e.g. oxygen.

The processes and aqueous compositions produce H. (hydrogen atoms) which form the product hydrogen gas. It is possible to use these hydrogen atoms as reactants for a variety of reduction or hydrogenation reactions in situ. Thus, gaseous $CO_2$ can be passed through the aqueous composition while hydrogen atoms are being produced to form CO. Similarly nitrogen gas can be passed through to form ammonia.

Various changes and modifications may be made and features described in connection with any one of the embodiments may be used with any of the others within the scope of the inventive concept, and in particular includes chain reaction agents which function in the manner described herein.

I claim:

1. A process for producing hydrogen comprising applying gammarays or X-rays to an aqueous composition comprising (1) at least one photoexcitable reagent which strongly absorbs said radiation energy at ground level causing it to enter its oxidized state and donate an electron whereby the reagent is oxidized, and at least one reagent (2) being at least one non-sacrificial chain reaction agent which forms a free radical in said aqueous composition and which reduces the oxidized photoexcited reagent when said composition is exposed to said radiation; and at least one reagent (3) being at least one spectral sensitizer whereby hydrogen is produced.

2. The process of claim 1 wherein said photoexcitable reagent is at least one cation selected from the group consisting of $Fe^{++}$, $Co^{++}$, $Ni^{++}$, $Pb^{++}$, $Pt^{++++}$, $Cr^{++}$, $Rh^{+++}$, $ZrO^{++}$, $Ti^{+++}$, $Ce^{+++}$, $V^{++}$, $U^+$, $Pt^{++}$, $Pd^{++}$, $Au^{++}$, $Ag^+$, $U^{+++}$, and $Eu^{++}$ and anionic complexes of said cations.

3. The process of claim 2 which contains at least one boride compound which has at least one hydrogen atom bonded to boron or the ability to bond to a hydrogen atom in the aqueous composition during production of hydrogen as a chain reaction agent.

4. The process of claim 2 wherein said chain reaction agent is a boride containing boron, hydrogen and at least one metal selected from the group consisting of cobalt, nickel, copper, iron, titanium, vanadium, zirconium, manganese, tin, platinum, rhodium, ruthenium, palladium, osmium and iridium.

5. The process of claim 4 which contains at least one additional chain reaction agent selected from the group consisting of hydrogen sulfite, thiosulfite, thiosulfate, dithionite, dithionate, hydrogen selenite, and hydrogen tellurites.

6. The process of claim 1 wherein said photoexcitable ion is at least one cation selected from the group consisting of $Fe^{++}$, $Co^{++}$, $Ni^{++}$, $Pb^{++}$, $Pt^{++++}$, $Cr^{++}$, $Rh^{+++}$, $Ru^{+++}$, $Ti^{+++}$, $ZrO^{++}$, $Ce^{+++}$, $V^{++}$, $Cu^+$, $Pt^{++}$, $Pd^{++}$, $Au^{++}$, $Ag^+$, $U^{+++}$, and $Eu^{++}$ and 7. The process of claim 1 wherein said photoexcitable reagent is at least one anion selected from the group consisting of $I^-$, $Br^-$, $Cl^-$, $NO_3^-$, $SO_4^=$, $SeO_4^=$, $TeO_4^=$, $ClO_4^=$, $PO_4^=$, $SiO_4^=$, $BO_3^-$, $BO_2^-$, $B_4O_7^=$, $S^=$, $SH^-$, and $S_2O_6^=$.

8. The process of claim 1 wherein said photoexcitable reagent is at least one colloidal metal particle.

9. The process of claim 2 or 7 or 8 which contains at least one spectral sensitizer selected from the group consisting of diphenyl, terphenyl, quaterphenyl, naphthalene, anthracene, phenanthrene, pyrene, and chrysene.

10. The process of claim 2 or 7 or 8 which also contains silica as a dispersing agent whereby said composition is in the form of an aqueous solution containing fine particles.

11. The process of claim 1 which contains at least one boride compound which has at least one hydrogen atom bonded to boron or the ability to bond to a hydrogen atom in the aqueous composition during production of hydrogen as a chain reaction agent.

12. The process of claim 1 wherein said chain reaction agent is a boride containing boron, hydrogen and at least one metal selected from the group consisting of cobalt, nickel, copper, iron, titanium, vanadium, zirconium, manganese, tin, platinum, rhodium, ruthenium, palladium, osmium and iridium.

13. The process of claim 3 or 12 or 5 containing at least one spectral sensitizer selected from the group consisting of anthracene, indigo, phthalocyanine, copper phthalocyanine, diphenyl and tris(2,2-bipyridyl) Ru(II) chloride.

14. The process of claim 13 which also contains silica as a dispersing agent whereby said composition is in the form of an aqueous solution containing fine particles.

15. The process of claim 1 wherein said chain reaction agent is an anion having the formula $(Y-X_n-H)^-$ or $(Y-X_m-Y)^=$ wherein X is at least one element selected from the group consisting of boron, sulfur, selenium, tellurium and phosphorus, and Y is at least one element selected from the group consisting of hydrogen, oxygen, sulfur, selenium and tellurium and wherein n and m are each an integer which is at least 1.

16. The process of claim 1 containing at least one spectral sensitizer selected from the group consisting of polyphenyls and polynuclear aromatic hydrocarbons.

17. The process of claim 1 which also contains a dispersing agent whereby said composition is in the form of an aqueous solution containing fine particles.

18. The process of claim 1 wherein said photoexcitable reagent is a methyl viologen-type compound and wherein said composition also contains at least one chain reaction agent.

19. The process of claim 18 wherein said chain reaction agent is at least one boride compound which has at least one hydrogen atom bonded to boron or the ability to bond to a hydrogen atom in the aqueous composition during production of hydrogen as a chain reaction agent, and which also contains a dispersing agent.

20. The process of claim 19 wherein said boride chain reaction agent is sodium borohydride and wherein said dispersant is colloidal silica.

21. The process of claim 1 wherein said photoexcitable reagent is an anionic reagent and wherein said composition also contains at least one spectral sensitizer.

22. The process of claim 21 which also contains sodium borohydride and a dispersing agent.

23. A process for producing hydrogen comprising applying gamma-rays or X-rays to an aqueous composition comprising
at least one photoexcitable ion formed by said composition containing at least one salt selected from the group consisting of $H_2PtCl_6$, $Cr(NO_3)_2$, $FeCl_2$, $CoAc_2$, $CoCl_2$, $PbCl_2$, $PbAc_2$, $NiCl_2$, $RhCl_3$, and $RuCl_3$;
at least one spectral sensitizer selected from the group consisting of anthracene, indigo, phthalocyanine, copper phthalocyanine, diphenyl and tris(2,2-bipyridyl) Ru(II) chloride;
$NaBH_4$ and an acidic colloidal silica whereby hydrogen is produced.

24. A process for producing hydrogen by applying gammarays or X-rays to an aqueous composition comprising (1) at least one photoexcitable reagent which strongly absorbs said radiation energy at ground level causing it to enter its oxidized state and donate an electron whereby the reagent is oxidized, and at least one reagent (2) or reagent (3), said reagent (2) being at least one non-sacrificial chain reaction agent which forms a free radical in said aqueous composition and which reduces the oxidized photoexcited reagent when said composition is exposed to said radiation; and said reagent (3) is at least one spectral sensitizer to produce hydrogen gas from the water molecules of said aqueous composition.

25. A process for producing hydrogen comprising applying gamma-rays or X-rays to an aqueous composition comprising (1) at least one photoexcitable reagent which strongly absorbs said radiation energy at ground level causing it to enter its oxidized state and donate an electron whereby the reagent is oxidized, and at least one reagent (2) being at least one non-sacrificial chain reaction agent which forms a free radical in said aqueous composition and which reduces the oxidized photoexcited reagent when said composition is exposed to said radiation; at least one reagent (3) being at least one spectral sensitizer; and a dispersing agent whereby said composition is in the form of an aqueous solution containing fine particles whereby hydrogen is produced.

26. The process of any one of claim 1, 2, 7, 8, 3, 4, 5, 16, 18, 21, 22, 23, or 25 wherein gamma-rays are applied to said aqueous composition.

* * * * *